May 25, 1943.  H. J. LA DUE  2,320,145
TARGET FISH
Filed June 5, 1940  3 Sheets-Sheet 1
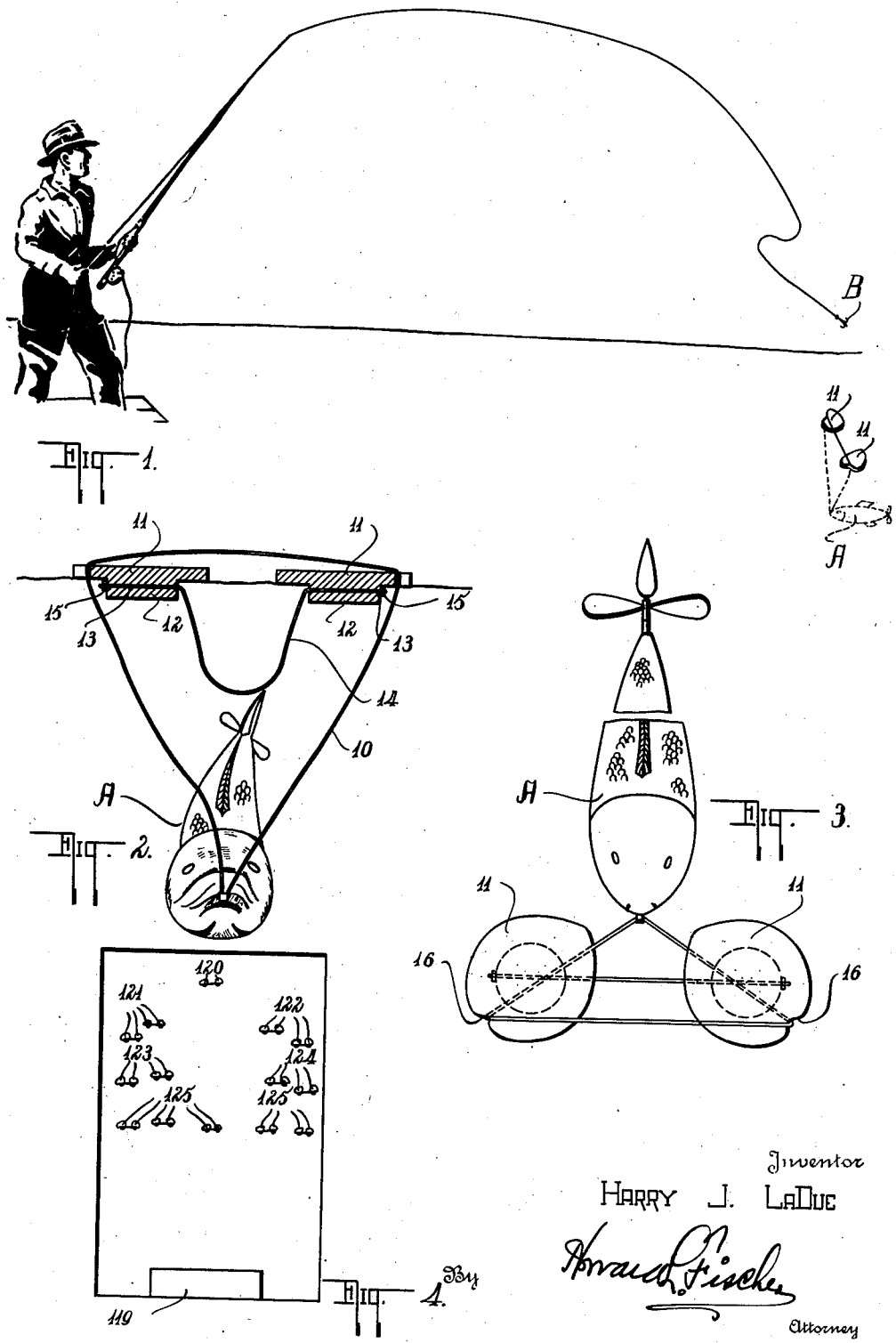
Inventor
HARRY J. LaDUE
Howard Fischer
Attorney May 25, 1943.  H. J. LA DUE  2,320,145
TARGET FISH
Filed June 5, 1940  3 Sheets-Sheet 2
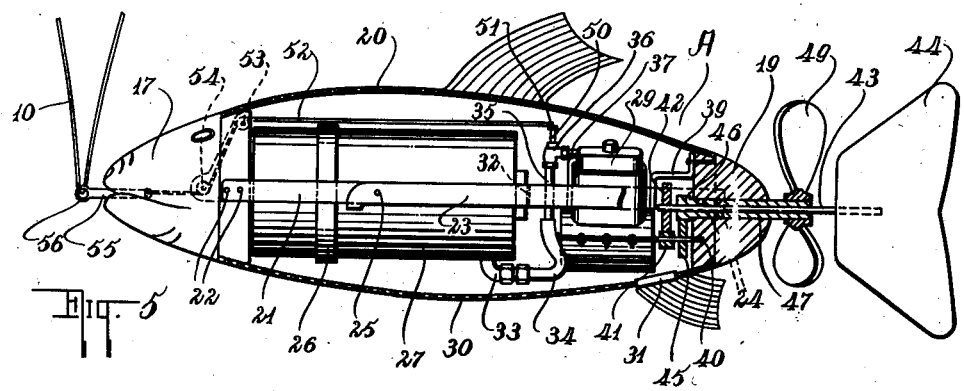
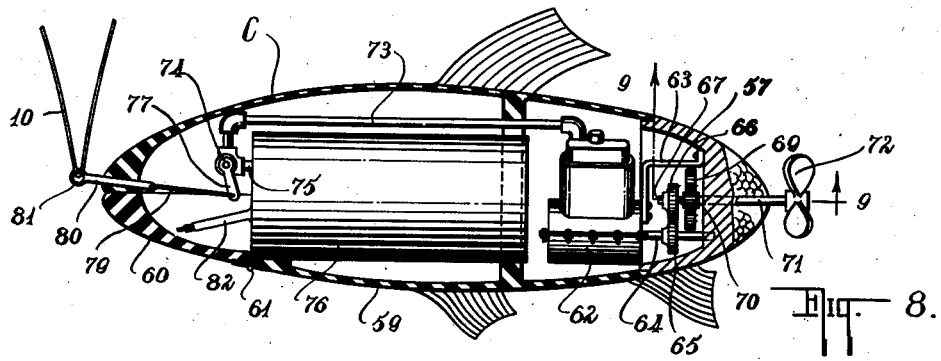
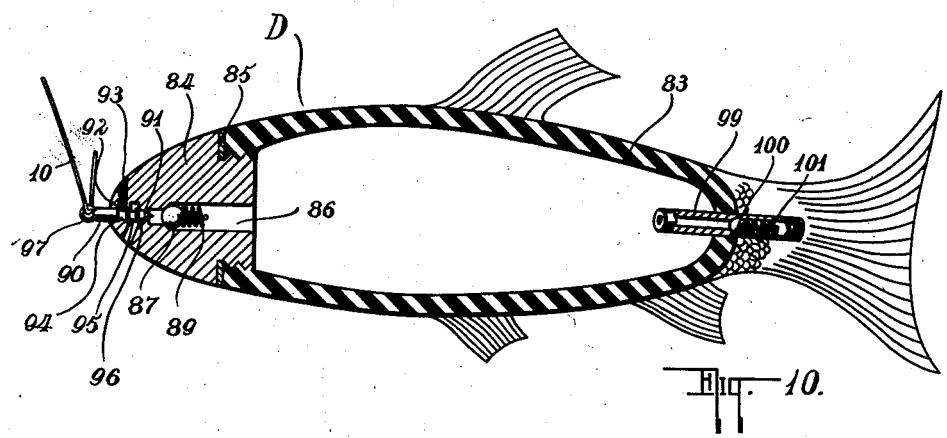
Inventor
HARRY J. LaDue
By Howard Fischer
Attorney

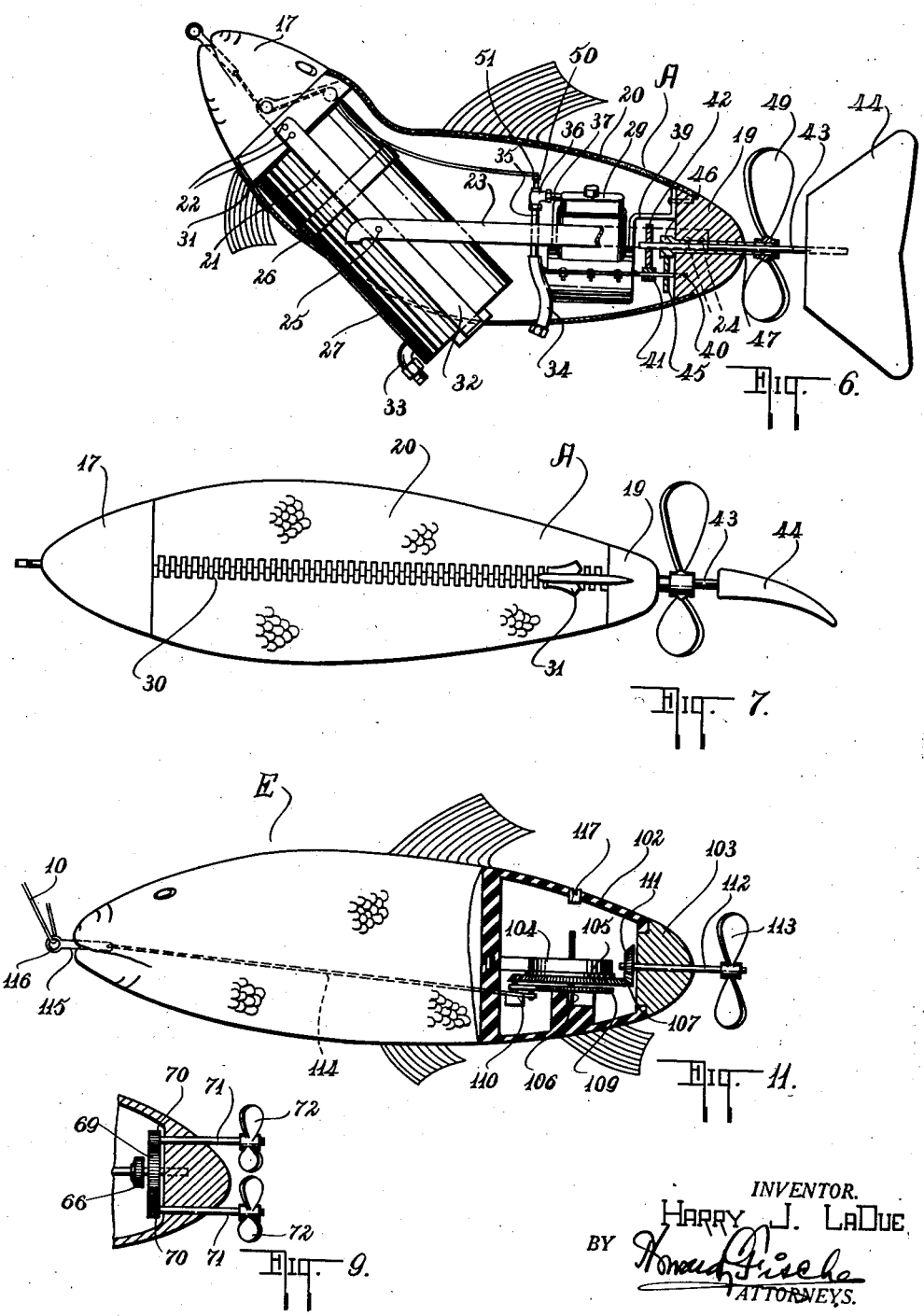

Patented May 25, 1943

2,320,145

UNITED STATES PATENT OFFICE 2,320,145

TARGET FISH

Harry J. La Due, Duluth, Minn.

Application June 5, 1940, Serial No. 338,955

15 Claims. (Cl. 273—102)

My invention relates to an improvement in target fish wherein it is desired to provide an artificial fish which may be used in sport contests or games and which may, under certain conditions, simulate the actions of a live fish.

In casting contests which are now commonly held in various parts of the country, it has been common practice to provide a relatively small target at which the person casting a bait or lure may aim. The skill of persons casting the bait and lure has proven attractive to thousands of persons. The casting contest, however, in no way simulates the actual conditions under which casting for fish ordinarily takes place.

It is the object of the present invention to provide a means such as an artificial fish or the like, which may be made to simulate in appearance any type of fish which may be caught by casting. This fish is normally concealed beneath the surface of the water but is provided with a trigger means which when released, will initiate the movement of the fish through the water. If the person casting the bait is sufficiently skillful to engage the trigger on the fish, the operating mechanism will be released and the fish will start movement through the water. Thus the casting contest may simulate in appearance the actual catching of fish in a body of water.

It is an object of my invention to provide a target fish which may be anchored a predetermined distance from the person casting. Thus persons skillful at casting a bait or lure may position the target fish at a greater distance from the point of the cast than would be required for persons less skillful and accurate at casting. Thus my target fish may be used to provide amusement and education for persons learning to cast, as well as for those more skillful in that art.

It is a feature of my invention to provide a target fish which may be anchored at any desired spot in the water and which may be removably secured to a pair of spaced floats between which the bait or lure must pass. These floats may be formed to simulate objects naturally found in a lake or pond, such as lily pads, and may be held at any convenient distance apart. The distance between the floats may be varied according to the skill of the person casting for the target, it being understood that the wider apart the floats may be positioned, the more easily the bait or lure may engage the trigger of the target fish.

It is a further feature of my invention to provide a target fish provided with a trigger which may be operated by a wire or cord which extends over the spaced floats, thus extending between the spaced targets. The targets support the wire or cord on or adjacent the surface of the water, so that a lure drawn between the floats will engage this operating cord to actuate the trigger of the target fish.

It is a further feature of my invention to provide an operating means for the fish which will be set in motion by the trigger and which may be one of a number of forms of motive power. When set in motion, the fish may be designed to travel in a straight path, in a curved or spiral path, or in a circle, depending upon the action of the particular fish which the target fish is made to simulate. If it is so desired, the fish may be made to leap from the water by properly shaping the fish to travel in a path toward the surface of the water at a relatively high rate of speed. Obviously, the target fish may become disconnected from the bait or lure unless the person making the cast is proficient at landing a fish as well as at making a cast. Thus my target fish not only makes target casting contests more interesting to watch, but it also makes them more interesting to the person making the cast and skill in landing the fish is required as well as skill in making the cast.

It is a feature of my invention that if it is so desired, a number of targets may be placed in a pool at varying distances and directions from the person casting so that a game of skill may be played therewith. The target fish stationed at the most remote points from the caster are more difficult to catch and thus may count the most when caught. Points may be granted each player for each fish properly caught and also for skill in landing the fish, less points being awarded a player who permits the target fish to get away from the hook or lure once it has been caught. Thus a game may be provided which any person interested in fishing may play and which should be extremely interesting to watch as well as to play.

These and other objects and novel features of my invention will be more clearly and fully set forth in the following specification and claims.

In the drawings forming a part of my specification:

Figure 1 is a diagrammatic view of a fisherman casting for a target fish.

Figure 2 is a cross-sectional view through the target floats showing the method of attachment of the target fish thereto.

Figure 3 is a top plan view of the floats and target as illustrated in Figure 2.

Figure 4 is a diagrammatic view of a series of targets positioned in a pool for use in playing a game of skill.

Figure 5 is a side elevation view partly in section of a type of target fish which may be constructed.

Figure 6 is a side elevation view partly in section of the target fish illustrated in Figure 5, the fish being arranged for removal of a part of the operating means.

Figure 7 is a bottom plan of the target fish illustrated in Figures 5 and 6.

Figure 8 is a side elevation view partly in section of another form of target fish construction.

Figure 9 is a sectional view of the rear portion of the target fish illustrated in Figure 8, the position of the section being indicated by the line 9—9 of Figure 8.

Figure 10 is a side elevation view partly in section of another form of target fish construction.

Figure 11 is a side elevation view partly in section of another form of target fish which may be constructed.

The target fish A is provided with a trigger which will be later described in detail and which is operated by a pull cord or operating wire 10. This pull cord or operating wire is flexibly looped over a pair of spaced floats 11 which may if desired simulate lily pads in appearance. The floats 11 are provided with a downwardly projecting central portion 12 through which the aligned ends 13 of a connecting wire 14 may extend. The wire 14 is held in place by nuts 15 and the central downwardly projecting loop 14 spaces the portion of the wire connecting means between the floats 11 substantially below the surface of the water so as to not be engaged by the bait or lure B being cast by the fisherman.

The floats 11 are provided with notches 16 of any preferred type to hold the pull cord 10 in place thereupon. This pull cord or wire 10 extends between the floats on or adjacent the surface of the water so as to engage the bait or lure B. If this bait or lure is drawn between the floats 11, the hooks thereupon will engage the pull cord 10 so that the trigger on the target fish may be actuated.

The fish A may be formed as best illustrated in Figures 5, 6 and 7 of the drawings. This target fish A comprises a head portion 17, a tail portion 19, and a connecting body portion 20. The head portion is shaped to simulate the head of any desired type of fish, while the tail end 19 is shaped to simulate the rear end of the body of the fish adjacent the tail. The head end 17 and the tail end 19 are substantially solid while the body 20 may be in the form of a shell to contain the operating mechanism.

The body 20 of the fish may be formed of resilient plastic material which may be shaped and colored to simulate the body of a fish or may be of any desired material to accomplish the necessary result. A metal mesh having overlapping metal plates to simulate the scales of a fish has been used successfully and if additional means is required to reinforce the body and to form the proper shape of body, such means may be provided.

A pair of side links or braces 21 are rigidly secured at 22 to the head end 17 and a pair of similar links 23 are secured at 24 to the rear end portion 19 of the fish A. The links 21 are connected to the links 23 on transversely aligned pivots 25 so that the head end supported by the braces 21 may be pivoted relative to the rear braces or links 23.

A hoop or ring 26 is secured to the links 21 and this hoop or link is designed to accommodate a tank 27 which in the form shown may be either a tank of compressed air or a gas generating tank for creating fluid such as air or gas under pressure to an operating motor 29. A hookless fastener 30 may be provided extending longitudinally along the bottom of the fish as illustrated in Figure 7 and this hookless fastener may be opened and closed by the slidable element 31 which in preferred form may be formed or shaped to simulate a fin of a fish. When the hookless fastener 30 is opened and the links 21 and 23 are pivoted one relative to the other, the tank 27 may be removed through the opening formed in the body which is normally closed by the hookless fastener. The free ends 32 of the links 21 may frictionally engage the tank 27 under spring tension to hold the same in place until it is removed.

On the tank 27 adjacent the hookless fastener 30 I provide a fitting 33 which may be connected by the flexible connector 34 to the inlet 35 to the valve 36. The valve 36 is connected by a tubular connection 37 to the inlet of the motor 29. The motor 29 may be of any practical type operated either by air pressure or by gas under pressure and may be selected from any one of a number of such motors in common use at the present time.

The motor 29 is secured by a bracket 39 to the rear end 19 of the fish A and when actuated rotates a drive shaft 40. The drive shaft 40 rotates a pinion 41 which meshes with a gear 42 on the shaft 43. The tail 44 is thus rotated by the motor 29 at a relatively slow rate of speed causing the direction of movement of the fish to be constantly changed.

The drive shaft 40 also supports the drive gear 45 which engages the pinion 46 mounted upon the sleeve 47 encircling the shaft 43. The propeller 49 is mounted upon the sleeve 47 and because of the gear ratio rotates at a much higher rate of speed than the tail 44.

The valve 36 is provided with a valve stem 50 which supports an operating lever 51. This operating lever 51 is operated by the flexible cord or wire 52 connected thereto. The cord 52 extends over guides such as pulleys 53 and 54 and is secured to a trigger member 55. This trigger member is provided with a loop end 56 to which the pull cord 10 is secured. Thus by pulling upon the pull cord 10, the trigger 55 is pulled outwardly, exerting a pull upon the connecting cable or cord 52 which pivots the operating lever 51 of the valve 36 into open position and permits a flow of air or gas under pressure to the motor 29.

The tank 27 may be of any desired type and may be used to contain air under pressure or a generated gas. Such a gas may be formed by a mixture of dry ice, carbide and water or any other conveniently formed gas may be employed.

In Figure 8 of the drawings I disclose a modified form of construction which is quite similar to that previously described. This type of target fish C is provided with a partially hollow end member 57 which is secured to a hollow fish body 59. This body is provided with a removable opening 60 which is connected by the hinge 61 to the body and which may simulate the lower jaw of the fish. This closure 60 is naturally closed under all normal conditions unless it is desired to fill the operating tank.

The operating motor 62 is secured to the rear end member 57 by means of a bracket 63. The motor 62 is provided with a drive shaft 64 upon which is mounted a gear 65. The gear 65 rotates a gear 66 on a central shaft 67 upon which is also mounted a gear 69. The gear 69 as best illustrated in Figure 9 of the drawings, constantly engages a pair of pinions 70 mounted on propeller shafts 71. Propellers 72 are provided on each of the shafts 71 for driving the fish through the water. The motor 62 is shown of a type normally driven by compressed air or the like.

The intake of the motor 62 is connected by the pipe line 73 to the valve 74, which in turn is connected by the pipe 75 to the compressed air tank 76. An operating lever 77 on the valve 74 is operated by a cord or link 79 attached to a trigger 80. The trigger 80 is provided with a loop end 81 to accommodate the pull cord 10. By pulling upon the trigger 80 the valve operating lever 77 is pivoted into open position, releasing air from the tank 76 into the motor 62 and causing operation of the same.

The tank 76 is provided with a filling stem 82 which is located within the pivotally mounted jaw 60 of the fish. Thus when the air within the tank 76 has been expended, it is only necessary to pivot the jaw 60 into open position and to refill the tank 76 through the valve stem 82. The valve 74 is of course first set in closed position. When the tank 76 has been filled, the target fish C is again in readiness for operation.

In Figure 10 of the drawings, I disclose another modified form of fish indicated in general by the letter D. This fish D is provided with a body 83 which may be of any desired material, such as plastic or the like. The body is hollow and is equipped with a removable head 84 which is threadably or otherwise engaged with the body 83. A sealing gasket 85 prevents water from entering the body 83.

Extending through the head 84 I provide a passage 86 which is closed by a ball check valve 87 urged into closed position by a light spring 89. Also closing the passage 86, I provide a plunger valve 90 which is held against its valve seat 91 to normally close the passage. A spring urged retaining ball 92 is urged by the spring 93 into a circumferential groove 94 in the plunger valve 90. A second groove 95 is provided in spaced relation to the groove 94 and holds the plunger valve 90 in open position. A passage 96 or series of passages, permits water to flow into the passage 86 when the plunger valve 90 is in open position. The plunger valve 90 is provided with a loop end 96 to accommodate a pull cord 10.

Near the rear end of the fish body, I provide a pair of tubes 99 or passages, extending through the body but normally closed by ball check valves 100 urged into closed position by a spring 101. The ball check valves 100 prevent the flow of water through the tubes 99. Thus the interior of the body is normally sealed against the entrance of water although the fish may be submerged in the lake or pool.

Within the body of the fish D, I place a gasifiable material, such as carbide or the like, which when combined with water, will form a gas under pressure within the body of the fish. This material is placed within the body but no water is permitted to enter the body and therefore no pressure is built up within the body of the fish. When a pull is exerted on the pull cord 10, the plunger valve 90 is pulled from the closed position indicated in the drawings, outwardly, the ball retainer 92 engaging in the slot 95 and holding this plunger valve in open position. The pressure of the water outside of the body is sufficient to open the ball check valve 87 and permit water to enter through the passage 86 into the interior of the fish. This water combines with the carbide or other gasifiable material, and forms a gas under pressure which closes the check valve 87. When sufficient pressure is generated, the check valves 100 in the tubes or passages 99 are opened and the gases escaping through these tubes force the fish through the water in the manner of a rocket. Depending upon the design and shape of the exterior of the fish, the movement may be in a straight line or in any predetermined path, depending upon the action of the fish simulated.

Obviously the generating system illustrated in Figure 10 of the drawings may be used to drive a motor such as the motor 29 or 62, or the tanks such as 27 and 76 may produce air or gas under pressure which may be expelled from the body in the manner illustrated in Figure 10. However, for simplification in following, one form of propelling means is used with one source of power supply in order to obviate the necessity of showing all of the various forms of power in combination with all of the various types of driving means.

While any of the forms of target fish can be provided with a governor capable of shutting off the power supply at intervals for a predetermined time and thus cause violent spasmodic movements, the target fish D is an example of such a structure. When the gas generated is expelled from the fish through the tubes 99, the check valve 87 may again open, admit a little more water, and generate more gas. Movement of the fish again takes place until the generated gas escapes, and this action continues until all the chemical within the body has been exhausted. A spasmodically moving target fish is thus provided.

In Figure 11 of the drawings, I disclose a modified form of target fish construction indicated in general by the letter E. In this construction the body 102 is provided with a removable rear end portion 103 and within the body 102 I provide a spring motor 104. The spring motor 104 may be any preferred type, but in the form illustrated, comprises merely a coil spring 105 which is mounted upon a winding shaft 106 to which is secured a bevel gear 107 and a ratchet 109. A dog 110 normally engages the ratchet 109 and holds the spring 105 wound. When, however, the ratchet dog 110 is released from the ratchet 109, the bevel gear 107 is rotated by the spring 105, rotating the co-operating bevel gear 111 mounted upon the propeller shaft 112 bearing the propeller 113.

The ratchet dog 110 may be released by means of the cord or link 114 secured to the operating trigger 115 provided with a loop 116 to accommodate the pull cord 119. Thus by exerting a pull upon the trigger 115 the spring motor 104 may be set into action to move the fish E through the water.

In order to wind the motor 104 the plug 117 may be removed and a suitable key inserted through the opening which is engageable with the shaft 106 to wind the spring 105.

The specific manner in which the various types of mechanism may be set into operation have been described and the fact that the fish may be made to travel along a straight path or any predetermined path has also been explained. The fish may be used in exhibitions or in casting contests, or may be used in a game by arranging a series of the fish at various distances and in various directions from the casting point, or it may be used by an individual desiring to perfect himself in the skill of casting, hooking, playing and landing a fish. In Figure 4 of the drawings I disclose a casting system or dock 119 upon which a player may stand and cast, attempting to direct the bait past the targets and between the same so that the bait or lure will engage the pull cord 10 as the same is pulled toward the person casting. The player or individual may also cast at the targets from a boat, or while standing in the water.

With reference to Figure 4 of the drawings, the floats 120 spaced at the greatest distance from the casting platform may represent a muskellunge and the target fish used in conjunction therewith may be extremely large and be properly shaped to simulate the movement of a muskellunge. The floats 131 may represent brook trout, while the floats 122 may represent rainbow trout. The floats 123 may represent black bass and the floats 124 may represent crappies. The front row of floats indicated by the numeral 125, represent sun fish and are smaller in size and do not have the same power as the larger and stronger fish.

In the game the particular equipment which is used to catch each type of fish is specified and the contestants must use the proper equipment for each type of fish which of course in all cases is similar for each contestant. The following rules and points may be made for such a game, it being understood that this type of game is only illustrative of one of many which could be played with my equipment.

Rules

1. There shall be two judges, one at each end of the pool.
2. Contestants shall each be given a number and they shall cast in numerical rotation.
3. Contestants shall use the above equipment for each species of fish.
4. Contestants shall cast at and catch the fish in the pool in the following rotation—i. e., all of the sunfish, crappies, black bass, brook trout, rainbow trout and muskellunge.
5. Contestant shall be required to stand on the casting platform while casting, playing and landing each fish.

Points

1. Each contestant shall start out with 100 points.
2. If the lure strikes the water beyond or past the lily pad target, it shall count as a cast and for each failure to hook the contact wire between the lily pads, one point shall be deducted from the contestant's original 100 points or points remaining to his credit.
3. If contestant loses any sunfish or crappie, one point shall be deducted for each fish lost.
4. If contestant loses any black bass or brook trout, two points shall be deducted for each fish lost.
5. If contestant loses any rainbow trout, five points shall be deducted for each fish lost.
6. If contestant loses any muskellunge, ten points shall be deducted for each fish lost.
7. If contestant breaks either rod, line or leader in such fashion as to prevent landing fish, fifteen points shall be deducted for each such failure.
8. The contestant retaining the greatest number of points after casting at all the targets shall be the winner of the contest.
9. If two or more contestants tie for places, the winner can be adjudged in any fair and equable manner selected by the judges.

It will be seen that my devices offer great educational and sporting possibilities. As an educational device it offers a combination of educational objectives including casting, skill, accuracy, and skill in playing and landing a fish. My device adds the sporting thrill of hooking, playing and landing fish to an otherwise prosaic game of casting at stationary or inactive motionless targets. My device is adaptable for use in indoor and outdoor pools, and in ponds, lakes and streams. It may be played and used by men, women and children, and can be made an attractive and thrilling game or sport by the individual or organization owning or using the equipment. All types of fish rods can be used, such as bait casting rods, fly rods, surf casting rods, and the like.

If it is so desired, the power device for operating the target fish may be electrically operated. The source of supply of electricity may be supplied either by suitable batteries contained within the body of the target fish, by a suitable cable continuously connected to the fish, or by an insulated cord cast by the player. The fish line used in casting may be a light insulated wire cooperable with a snap socket or the like on the fish, so that when the fish is caught, the normally sealed snap socket on the line will furnish power to the fish for operating the same.

While I have defined certain materials which are used for the construction of the fish, it will be understood that they may be made of a wide variety of materials, including wood, metals, rubber, plastic compositions, and chemical preparations. They may be made into a replica of any known fish and shaped and designed accordingly. My target fish may be weighted or provided with air chambers and may be either water-tight or otherwise. It may be made in one or in several pieces. The power unit may provide steady power, a cumulative power, or increasing and decreasing power impulses. Thus the power may be continual or spasmodic. The motor power may come from compressed air, gas, energy fuels, spring or rubber motors, electricity, or any source of power propulsion. While the specific forms of construction illustrated have certain advantages, changes in these constructions may be made. While the target fish is shown resting in a horizontal position beneath the floats, the fish may in some instances be suspended vertically beneath the floats and turn horizontally when the power is applied.

In accordance with the patent statutes, I have described the principles of construction and operation of my target fish, and while I have endeavored to set forth the best embodiments thereof, I desire to have it understood that these are only illustrative of a means of carrying out my invention and that obvious changes may be made within the scope of the following claims without departing from the spirit of my invention.

I claim:

1. A target fish comprising a body designed to move through the water and to simulate a fish, a normally inactive means for driving said body through the water, means controlling said driving means to start said driving means in motion, disengageable means operable, when engaged with said controlling means, to actuate the same, and means connected to said body for holding said fish in position beneath the surface of the water when said driving means is not in operation.

2. A target fish comprising a body designed to move through the water and to simulate a fish, a normally inactive means for driving said body through the water, a control means for starting said driving means in motion, float means designed to float on the surface of the water, and means suspending said body spaced beneath said float means.

3. A target fish comprising a body designed to move through the water and to simulate a fish, a normally inactive means for driving said fish through the water, a control means which, when operated, starts said driving means in motion, a float designed to float on the surface of the water, and means suspending said body spaced beneath said float, said suspending means connected to said control means for actuating the same.

4. A target fish comprising a body designed to move through the water and to simulate a fish, a normally inactive means for propelling said body through the water, a means operable, when actuated, to start said propelling means in motion, a float means, and means detachably securing said body to, and spaced beneath, said float means, said securing means connected to said starting means to actuate the same.

5. A target fish comprising a body designed to move through the water and to simulate a fish, a normally inactive means for propelling said body through the water, a control operable, when actuated, to start said propelling means in motion, a pull cord including loop means for actuating said control, and means for detachably supporting said pull cord loop means near the surface of the water.

6. A target fish comprising a body designed to move through the water and to simulate a fish, a normally inactive means for propelling said body through the water, a control operable, when actuated, to start said propelling means, a pull cord for actuating said control, and a pair of spaced floats between which said pull cord is stretched.

7. A target fish comprising a body designed to move through the water and to simulate a fish, a normally inactive means for propelling said body through the water, a control operable, when actuated, to start said propelling means, a flexible loop secured to said control, a pair of spaced floats, said loop detachably including said floats and extending therebetween.

8. A target fish comprising a body designed to move through the water and to simulate a fish, a normally inactive means for propelling said fish through the water, a means for controlling said propelling means, a pair of floats, means securing said floats in spaced relation, and a loop detachably encircling said floats and stretched therebetween secured to said control.

9. A target fish comprising a body, a normally inactive means for propelling said body through the water, a control for starting said operating means, a pair of spaced floats, means extending substantially below the surface of the water connecting said floats in spaced relation, and a loop detachably encircling said floats and stretched therebetween adjacent the surface of the water, said loop being attached to said control.

10. A target fish comprising a body designed to move through the water and to simulate a fish, a gas operated motor, a propelling means secured to said gas operated motor and operated thereby, a rotatable deflecting means operated by said motor to change the path of said fish body moving through the water, a source of supply of gas connected to said motor, and valve means between said source of supply of gas and said motor whereby the movement of said motor may be initiated.

11. A target fish comprising a hollow body designed to move through the water and to simulate a fish, a gas operated motor in said hollow body, propeller means operated by said motor, a compressed air supply, means connecting said compressed air supply and said motor, valve means in said connecting means whereby the flow of compressed air to said motor may be initiated, loop means secured to said valve means to operate the same, and means supporting said loop means near the surface of the water.

12. A target fish comprising a body designed to move through the water to simulate a fish, a normally inactive means propelling said body through the water, control means which, when actuated, initiates movement of said propelling means, means for operating said propelling means spasmodically, loop means forming a part of said control means, and means supporting said loop means adjacent the surface of the water.

13. A target fish comprising a fish-shaped body, a propelling means therefor, means on the surface of the water connected to said fish for supporting said target fish spaced beneath the surface of a body of water, and means controlling said propelling means to initiate movement thereof.

14. A target fish comprising a hollow body designed to move through the water and simulate a fish, a gas operated means for propelling said body, a gas generating tank within said hollow body, gas generating material within said tank, trigger means for initiating the gas generating action, and a means for controlling the flow of gas generated by said tank whereby said fish body may be set into motion.

15. A target fish comprising a hollow body designed to move through the water and to simulate a fish, a gas operated motor within said body, a source of supply of gas connected to said motor, means interposed between said source of supply of gas and said motor for initiating the flow of gas to said motor, flexible loop means secured to said initiating means for operating the same, means secured to said loop for supporting said body in the water, and propeller means operated by said motor to force said body through the water.

HARRY J. LA DUE.